June 10, 1924.

C. H. LIDDELL

DIRECTION INDICATOR

Filed Aug. 21, 1922

1,497,520

Patented June 10, 1924.

1,497,520

UNITED STATES PATENT OFFICE.

CHARLES H. LIDDELL, OF RAYMOND, WASHINGTON.

DIRECTION INDICATOR.

Application filed August 21, 1922. Serial No. 583,249.

*To all whom it may concern:*

Be it known that I, CHARLES H. LIDDELL, a citizen of the United States, residing at Raymond, in the county of Pacific and State of Washington, have invented certain new and useful Improvements in a Direction Indicator, of which the following is a specification.

This invention has relation to certain new and useful improved automobile attachments and comprises a direction indicator of simple construction arranged to be attached to the wind shield to indicate to a following car the direction the automobile will take.

The primary object of my invention is to provide a direction indicator, of simple, compact and efficient construction and arrangement of parts, adapted particularly to be attached to the windshield of an automobile, in such a manner as to be readily operated to indicate the direction in which the automobile is going to turn.

With these and other objects in view, the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification and in which like numerals of reference indicate similar parts in the several views.

Figure 1:
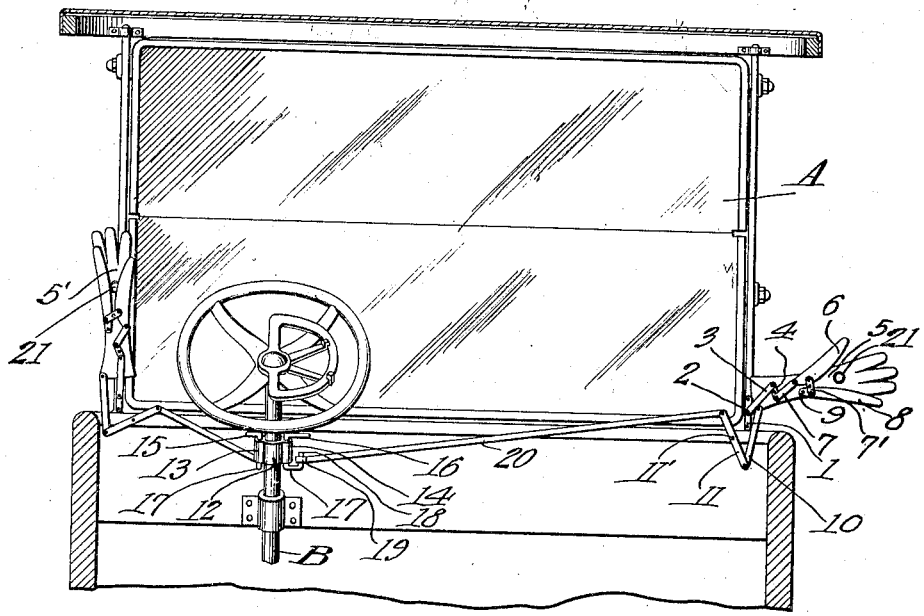
Figure 1 shows a view of an automobile windshield disclosing my indicator as attached thereto.

In the drawings A represents the windshield and B the steering post of an automobile equipped with my direction indicator, which as shown includes a securing base or member 1, having an upstanding lug 2, on which is pivotally held the link 3, which has its upper end pivotally held to the stub link 4. This stub link which is pivotally held to the indicator 5, in the form of a hand, has pivotally secured to it the rock link 7 to which is pivotally held the thumb forming member 6.

Held by means of the pivot 9 is the finger forming member 8 which finger 8 is also pivotally held to the rock link 7. Pivotally held to the indicator 5, is the pitman 10 which has its lower end pivoted to the lever 11, which is pivotally held to the windshield frame A intermediate of its ends.

Figure 2:
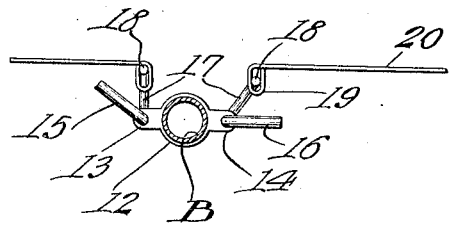
Figure 2 is a detail of the post collar and the operating levers.

Fixed to the steering post B, is the collar 12 having the outstanding ears 13 and 14 which give pivotal support to the operating levers 12 and 16. As shown in Figure 2 each operating lever has an angular extension 17 ending in an upstanding lug 18. As disclosed the rod 20 ends in the loop 19, in engagement with the lug 18 of the operating lever 16.

The indicator is supported by means of the members 3, and 10. In one position the indicator 5 is in a vertical position while in the other position of the instrumentalities the indicator is in a horizontal position.

On approaching a corner the operator actuates the lever 16 to shove the rod 20, outward resulting in the pitman 10 drawing the indicator 5 downward into a horizontal position. After the turn has been made and on turning the post B into the natural or intermediate position the collar 12 turns to automatically throw the rod 20 back into its original position resulting in the indicator being carried into upright position.

In Figure 1 the indicator 5 is shown in its original position, while the similarly constructed opposite indicator 5' is shown in a vertical position. It is of course understood that both indicators can be simultaneously thrown down.

As both indicators are similar in construction a description of the remaining indicator is not thought necessary.

From the foregoing description taken in connection with the drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my said invention, what I claim as new and desire to secure by United States Letters Patent, is:

1. In combination with an automobile, its windshield and steering post, a base secured to said windshield having a stud, a link pivotally fixed at one end to said stud, a flat member serving as a direction indicator, a stub link pivotally fixed to said flat member intermediate of its ends, said link pivotally secured to said first mentioned link, a rock arm pivotally fixed to said windshield, a link extending from said arm to said flat member, and a connecting rod extending from said steering post to said rock arm.

2. In combination, with an automobile, its windshield and steering post, of a stud secured to said windshield, a link pivotally held at one end to said stud, a flat member serving as an indicator pivotally held to the end of said link, a rock arm pivotally fixed intermediate of its ends to said windshield, a link extending from said rock arm to said indicator, an ear fixed to said steering post, an operating lever held to said ear, ending in an upstanding lug, and a connecting rod extending from said rock arm ending in an elongated loop in engagement with said lug, whereby on rocking said operating levers said indicator is carried from a vertical into a horizontal position.

3. In combination, with an automobile, its windshield and steering post, of a stud secured to said windshield, a link pivotally held at one end to said stud, a flat member serving as an indicator, a stub link pivotally fixed to said indicator, a moving member pivotally held to said indicator, a link extending from said moving member to said stub link, a rock arm pivotally fixed intermediate of its ends to said windshield, a link extending from said rock arm to said indicator, an ear fixed to said steering post, an operating lever held to said ear, ending in an upstanding lug, and a connecting rod extending from said rock arm ending in an elongated loop in engagement with said lug, whereby on rocking said operating levers said indicator is carried from a vertical into a horizontal position.

In testimony whereof, I affix my signature.

CHARLES H. LIDDELL.